US008856388B2

(12) United States Patent
McLeod

(10) Patent No.: US 8,856,388 B2
(45) Date of Patent: Oct. 7, 2014

(54) METHOD AND APPARATUS FOR CONNECTING USB DEVICES TO A COMPUTER

(75) Inventor: John Alexander McLeod, Surrey (CA)

(73) Assignee: Icron Technologies Corporation, Burnaby, BC (CA)

(*) Notice: Subject to any disclaimer, the term of this patent is extended or adjusted under 35 U.S.C. 154(b) by 0 days.

(21) Appl. No.: 13/991,466

(22) PCT Filed: Dec. 9, 2011

(86) PCT No.: PCT/CA2011/001348
§ 371 (c)(1),
(2), (4) Date: Jun. 4, 2013

(87) PCT Pub. No.: WO2012/083423
PCT Pub. Date: Jun. 28, 2012

(65) Prior Publication Data
US 2013/0262708 A1 Oct. 3, 2013

Related U.S. Application Data

(60) Provisional application No. 61/426,769, filed on Dec. 23, 2010.

(51) Int. Cl.
G06F 3/00 (2006.01)
G06F 13/36 (2006.01)
G06F 13/42 (2006.01)
H04L 29/06 (2006.01)
G06F 13/40 (2006.01)

(52) U.S. Cl.
CPC ........ G06F 13/4252 (2013.01); G06F 13/4045 (2013.01); H04L 67/38 (2013.01)
USPC .............................................. 710/2; 710/306

(58) Field of Classification Search
CPC .......................... G06F 13/4045; G06F 13/4252
USPC ....................................................... 710/2, 306
See application file for complete search history.

(56) References Cited

U.S. PATENT DOCUMENTS

| 5,890,015 | A  | 3/1999  | Garney et al. |
| 6,381,666 | B1 | 4/2002  | Kejser et al. |
| 6,650,640 | B1 | 11/2003 | Muller et al. |
| 6,904,489 | B2 | 6/2005  | Zarns         |

(Continued)

OTHER PUBLICATIONS

Hirofuchi et al. "USB/IP—a Peripheral Bus Extension for Device Sharing over IP Network", 2005 USENIX annual Technical Conference.

(Continued)

Primary Examiner — Ernest Unelus
(74) Attorney, Agent, or Firm — Manelli Selter PLLC; Edward J. Stemberger

(57) ABSTRACT

A method and apparatus are provided to enable a plurality of standard USB peripheral devices, utilizing the USB specification, to be distributed at various nodes across a network, wherein communications across the network may take advantage of any pre-existing network connectivity of a standard, non-modified USB host computer. In particular, a virtual host controller function is added to the host computer in order to direct data communications towards a pre-existing network transceiver. As a result, the host computer is not required to be provided with USB hardware and is able to communicate across the network using pre-existing data communication components.

19 Claims, 10 Drawing Sheets

(56) References Cited

U.S. PATENT DOCUMENTS

| | | |
|---|---|---|
| 7,149,833 B2 | 12/2006 | McLeod |
| 7,587,536 B2 * | 9/2009 | McLeod ............... 710/65 |
| 7,818,486 B2 | 10/2010 | McLeod |
| 2005/0209842 A1 * | 9/2005 | Klein ............... 703/25 |
| 2006/0123166 A1 * | 6/2006 | Toebes et al. ............... 710/106 |
| 2007/0168498 A1 * | 7/2007 | Lambert et al. ............... 709/224 |
| 2009/0024746 A1 | 1/2009 | Welch |
| 2010/0042767 A1 * | 2/2010 | McLeod ............... 710/300 |

OTHER PUBLICATIONS

Cherng-Ying Ing; Tzo-Lin Lee, "USBDevice Sharing Server for Office Environment", Asia-Pacific Services Computing Conference, 2008, APSCC'08. IEEE, vol. No. pp. 953-956 Dec. 9-12, 2008.
International Search Report in PCT/CA2011/001348 dated Feb. 3, 2012

* cited by examiner

METHOD AND APPARATUS FOR CONNECTING USB DEVICES TO A COMPUTER

FIELD OF THE INVENTION

This invention relates to methods and apparatus for transmitting signals between computers and devices using Universal Serial Bus (USB) ports, and, in particular, to a method for operating a plurality of USB peripheral devices from a host computer that is equipped with a data network connection.

DESCRIPTION OF THE PRIOR ART

Universal Serial Bus (USB) is a technology designed to permit a wide range of peripheral devices to be attached to personal computers by the average user. The technology supports all of the common peripheral devices such as keyboards, mice, speakers, joysticks, cameras, flash drives, hard drives, DVD drives and many others, and its use in current computers is common.

The specifications defining USB (e.g. Intel et al., Universal Serial Bus Specification, Revision 1.0, January 1996; and updated as Revision 1.1 in Sep. 23, 1998, and further updated as Revision 2.0 in April 2000, and subsequent updates, additions and modifications—hereinafter collectively referred to as the "USB Specification", which term can include future additions, modifications and revisions and in particular those additions under development for release as USB 3.0) are non-proprietary and are managed by an open industry organization known as the USB Implementers Forum (USB-IF). The USB Specification establishes a number of criteria which must be met in order to comply with USB standards. The USB Specification also defines a number of terms, which definitions are adopted for the purposes of this specification, and incorporated herein by reference.

Under the USB specification, USB data communication is managed by a USB host controller unit installed, preferably, in a host computer. Furthermore, the data communication occurs in a series of USB transactions wherein each USB transaction is initiated by a USB host controller and is composed of one, two or three subactions. Each subaction may be composed of one or more packets and is typically terminated by a reversal in the direction of data flow.

In Applicant's U.S. Pat. No. 6,381,666, the contents of which are incorporated herein by reference, a method and apparatus for extending the distance between a host computer and a peripheral device is provided which increased the useable distance to 100 meters or more. This greatly extended the 5 meter distance normally allowed under the USB Specification. However, while the approach described in U.S. Pat. No. 6,381,666, and later enhanced in Applicant's U.S. Pat. No. 7,149,833 (the contents of both of which are also incorporated herein by reference), made it possible to operate USB peripheral devices over an extended distance and in the presence of long transmission delays, it did not describe a configuration in which extended range was obtained by using the networking capabilities of the host computer.

In Applicant's U.S. Pat. No. 7,818,486, the contents of which are also incorporated herein by reference, a method and apparatus for connecting USB devices to a host computer is provided which enabled operation across a standard data communications network. While the approach detailed in U.S. Pat. No. 7,818,486 made it possible to reuse the data networking hardware and software of the host computer for USB communications, it did not describe a configuration in which USB hardware at the host computer could be eliminated.

U.S. Pat. No. 5,890,015 attributed to Garney et al. discloses a method and apparatus for implementing a wireless universal serial bus host controller by interfacing a universal serial bus hub as a universal serial bus device. Garney et al disclose that a USB host controller can be made to operate remotely by communicating with said remote USB host controller through a local USB port. However, the disclosure of Garney et al. is limited to computer input/output through USB ports and does not enable the data communications capabilities of a host computer containing said local USB port to also be utilized for USB-related purposes. Furthermore, the disclosure of Garney et al. does not enable USB hardware at the host computer to be eliminated U.S. Pat. No. 6,904,489 attributed to Zarns discloses methods and systems for remotely accessing universal serial bus devices. Zarns discloses that USB devices can be connected to a host computer over a data communications network. However, the disclosure of Zarns requires that the standard chain of USB driver processing be altered by intercepting, detecting and interrupting the handling of requests targeted at said remote USB devices. The disclosure of Zarns is thereby limited to systems in which the computer operating system enables such intercepting, detecting and interrupting to be performed in a reliable and efficient manner. Furthermore, the disclosure of Zarns does not enable USB hardware at the host computer to be eliminated A publication attributed to Hirofuchi et al. ("USB/IP—a Peripheral Bus Extension for Device Sharing over IP Network", USENIX, Association, FREENIX Track: 2005 USENIX Annual Technical Conference, pg. 47) discloses methods and apparatus for extending a peripheral bus across an IP network for the purpose of USB device sharing. However, the publication of Hirofuchi et al. requires that a personal computer capable of running a USB software driver stack be provided at both the local and remote locations. The publication of Hirofuchi et al. further requires that a stub driver be inserted in the software stack of the computer to which the peripheral devices are directly connected and that said stub driver shall be able to communicate with a set of co-located USB device drivers. Furthermore, the publication of Hirofuchi et al. requires the communication of USB Request Blocks (URB's) which limits the responsiveness and performance of the system.

Therefore, it would be desirable to provide methods and apparatus for connecting remote devices to a host computer in which connectivity can be performed using the data communication interfaces commonly included in such host computers and in which it is not necessary to interrupt or otherwise disturb the connectivity of the USB driver software stack. Further, what would also be desired is that said remote devices need not be directly connected to a computer that is capable of running a USB software driver stack and/or that said host computer need not be equipped with USB hardware. Further, what would also be desired is that the performance of said methods and apparatus should not be limited by the aggregation of USB transactions into USB Request Blocks.

SUMMARY OF THE INVENTION

The ability to reuse the often pre-existing network connectivity of a host computer rather than providing a dedicated network connection for USB extension purposes would be particularly beneficial when the cost of the network attachment hardware is significantly higher than the cost of the USB attachment hardware. By way of example, the cost of a transceiver that provides a wireless connection to an Ethernet network is considerably more than the cost of a USB transceiver. If the host computer were already equipped with a wireless transceiver for network attachment and USB traffic could be directed to the host computer's pre-existing wireless networking port, then the cost of an additional wireless transceiver can be avoided. Networks that employ fiber-optic or power-line technology which also exhibit high transceiver costs could also benefit from this same approach. Further, the possibility to eliminate USB ports altogether in a device, would further reduce costs by elimination of one or more USB transceivers.

Moreover, the approaches described in U.S. Pat. Nos. 6,381,666 and 7,149,833 did not require that any changes or additions to existing host computer operating software be made to obtain the extended distance capability. The approach described in U.S. Pat. No. 7,818,486 did not require that any changes to existing host computer operating software be made to obtain the extended distance capability. It would be advantageous if the attribute of no changes to existing operating software could be maintained in order to provide the most widely applicable solution and in order to preserve ease of use of the system. It would be further advantageous if any incremental software were to comply with existing operating system driver models.

Accordingly, while the range extending USB technology, as described in U.S. Pat. No. 6,381,666 and U.S. Pat. No. 7,149,833 has proven to be useful in linear configurations, and the transceiver reuse technology described in U.S. Pat. No. 7,818,486 has proven to be useful in networked configurations, it would still be desirable to provide improvements to the technology by providing an improved method and apparatus for enabling a plurality of USB peripheral devices, utilizing the USB specification, to be distributed at various nodes across a network, wherein communications across the network between a USB host computer and the USB peripheral devices may take advantage of, and use, any pre-existing network connectivity of the USB host computer and wherein said USB host computer is not required to be equipped with USB hardware.

Therefore, it is an objective of the present invention to provide methods and apparatus to enable a plurality of USB peripheral devices, utilizing the USB specification, to be distributed at various nodes across a network, wherein communications across the network between a USB-enabled host computer and the USB peripheral devices may take advantage of, and use, any pre-existing network connectivity of the USB-enabled host computer. In particular, it is an objective of the present invention to use pre-existing network transceivers as much as possible, during the transmission of data across the network.

It is a further object of the present invention that the methods and apparatus shall accommodate the transmission delays introduced by the data communications network and which delays may exceed the parameters defined by the USB specifications.

It is a further object of the present invention that the data communications network may transport additional traffic unrelated to the operation of the USB peripheral devices.

It is a further object of the present invention that the host computer may be connected to the data communications network by any conventional means.

It is a further object of the present invention that the host computer need not be equipped with USB hardware in order to communicate with said remote USB devices.

It is a further object of the present invention that no changes need be made to any pre-existing software drivers required to operate the host computer or the USB peripheral devices.

It is a further object of the present invention that no changes be required to the data communications network driver software running on the host computer.

It is a further object of the present invention that any additional software required to operate the host computer shall be compatible with the standard USB driver model.

It is a further object of the present invention that the performance and responsiveness of the system shall not be limited by the aggregation of USB transactions into higher level structures such as USB Request Blocks.

It is a further object of the present invention that the plurality of USB peripheral devices may be connected to the data communications network through a remote extender unit.

It is a further object of the present invention that USB traffic arriving at the remote extender unit may be distributed to a plurality of USB peripheral devices.

It is a further object of the present invention that corresponding capabilities may be provided in the reverse direction where USB traffic originates at a plurality of USB peripheral devices and terminates at the host computer.

These and other objects of the invention, which will become apparent herein, are fully or at least partially attained by the present invention which invention provides a method and related apparatuses, wherein a network adapter of a first host computer is connected to a data communications network to which one or a plurality of remote extender unit units may also be connected. Each remote extender unit may, in turn, be connected to one or a plurality of USB peripheral devices.

Accordingly, in a first aspect, the present invention provides a computer system for transmitting USB traffic between a host computer and one or a plurality of USB peripheral devices, wherein the host computer and the one or a plurality of USB peripheral devices are connected by a data communications network and wherein the host computer is equipped with a virtual USB host controller. In particular, the present invention provides a computer system for transmitting USB traffic between a host computer and one or a plurality of USB peripheral devices, wherein the host computer and the one or a plurality of USB peripheral devices are connected one to the other by a data communications network, the computer system comprising:

a. one or a plurality of host computers for generating and accepting USB traffic;
b. one or a plurality of USB peripheral devices capable of responding to USB traffic initiated by said one or a plurality of host computers;
c. one or a plurality of network connections between said one or a plurality of host computers and said data communications network;
d. one or a plurality of remote extender unit units, connected to said data communications network and utilized for connecting said one or a plurality of USB peripheral devices to said data communications network;
e. one or a plurality of host controller drivers in said one or a plurality of host computers for converting between USB Request Blocks and USB Transfer Descriptors;
f. one or a plurality of virtual host controllers in said one or a plurality of host computers for converting between USB Transfer Descriptors and virtual USB packets;
g. a virtual host application in said one or a plurality of host computers for establishing connection paths between said one or a plurality of virtual host controllers and said one or a plurality of USB peripheral devices;
h. a remote host application in said one or a plurality of remote extender units for establishing connection paths between said one or a plurality of virtual host controllers and said one or a plurality of USB peripheral devices;
i. a slave host controller driver in said one or a plurality of remote extender units for converting between virtual USB packets and USB Transfer Descriptors; and
j. a slave host controller in said one or a plurality of remote extender units for converting between USB Transfer Descriptors and USB packets.

In a further aspect, the present invention also provides a method for transmitting USB information from a host computer to a USB peripheral device across a data communications network, wherein said method is as of the present invention is as described herein with respect to the aforegoing disclosure and appended drawings. In particular, the present invention also provides a method for transmitting USB information from a host computer to a USB peripheral device across a data communications network, said method comprising;

a. generating a USB Request Block at a USB device driver;
b. forwarding said USB Request Block to a USB core driver as a forwarded USB Request Block;
c. delivering said forwarded USB Request Block to a host controller driver as a delivered USB Request Block;
d. transforming at a host controller driver said delivered USB Request Block into a sequence of Transfer Descriptors;
e. presenting said sequence of Transfer Descriptors to a virtual host controller as a presented sequence of Transfer Descriptors;
f. converting at a virtual host controller each individual Transfer Descriptor within said presented sequence of Transfer Descriptors into a virtual USB packet;
g. forwarding said virtual USB packet to a virtual host application as a forwarded virtual USB packet;
h. identifying at a virtual host application a network destination for said forwarded virtual USB packet and communicating said network destination to a network communications stack as an identified network address;
i. encapsulating at a network communications stack said forwarded virtual USB packet and said identified network address as an encapsulated virtual USB packet;
j. delivering said encapsulated virtual USB packet to a network transceiver as a delivered virtual USB packet;
k. transmitting at a first network transceiver said delivered virtual USB packet across a data communications network as a transmitted virtual USB packet;
l. receiving at a second network transceiver said transmitted virtual USB packet as received virtual USB packet;
m. forwarding at said second network transceiver said received virtual USB packet to a second network communications stack as a forwarded remote virtual USB packet;
n. extracting at said second network communications stack a virtual USB packet from said forwarded remote virtual USB packet as an extracted remote virtual USB packet;
o. delivering said extracted remote virtual USB packet to a remote host application as a delivered remote virtual USB packet;
p. identifying at a remote host application a slave host controller driver operable for said delivered remote virtual USB packet as an identified slave host controller driver;
q. conveying at a remote host application said delivered remote virtual USB packet to said identified slave host controller driver as a conveyed remote virtual USB packet;
r. scheduling at said identified slave host controller driver said conveyed remote virtual USB packet for transmission by a slave host controller as a scheduled remote virtual USB packet; and
s. transmitting at said slave host controller said scheduled remote virtual USB packet across a USB cable as a standard USB packet.

In a still further aspect, the present invention also provides a method for transmitting USB information from a USB peripheral device to a host computer across a data communications network, said method comprising;

a. transmitting at a USB peripheral device a standard USB packet across a USB cable to a slave host controller;
b. receiving said standard USB packet at said slave host controller as a received USB packet;
c. optionally, at said slave host controller transmitting a USB acknowledgement packet across said USB cable;
d. forwarding at said slave host controller said received USB packet to a slave host controller driver as a virtual USB packet;
e. delivering at said slave host controller driver said virtual USB packet to a remote host application as a delivered virtual USB packet;
f. identifying at a remote host application a network destination for said delivered virtual USB packet and communicating said network destination to a network communications stack as an identified network address;
g. encapsulating at a network communications stack said delivered virtual USB packet and said identified network address as an encapsulated virtual USB packet;
h. conveying said encapsulated virtual USB packet to a network transceiver as a conveyed virtual USB packet;
i. transmitting at a first network transceiver said conveyed virtual USB packet across a data communications network as a transmitted virtual USB packet;
j. receiving at a second network transceiver said transmitted virtual USB packet as received virtual USB packet;
k. forwarding at said second network transceiver said received virtual USB packet to a second network communications stack as a forwarded local virtual USB packet;
l. extracting at said second network communications stack a virtual USB packet from said forwarded remote virtual USB packet as an extracted local virtual USB packet;
m. delivering said extracted local virtual USB packet to a virtual host application as a delivered local virtual USB packet;
n. identifying at a virtual host application a virtual host controller operable for said delivered local virtual USB packet as an identified virtual host controller;
o. conveying at a virtual host application said delivered local virtual USB packet to said identified virtual host controller as a conveyed local virtual USB packet;
p. presenting at said identified virtual host controller said delivered local virtual USB packet to a virtual host controller driver as a presented local virtual USB packet;
q. aggregating at said virtual host controller driver a sequence of one or a plurality of said presented local virtual USB packets as a USB Request Block response;
r. delivering at said virtual host controller driver said USB Request Block response to a USB core driver as a delivered USB Request Block response; and s. forwarding at said USB core driver said delivered USB Request Block response to a USB device driver as a forwarded USB Request Block response.

DESCRIPTION OF THE PREFERRED EMBODIMENTS

In a preferred embodiment of a USB system, the host computers and the USB peripheral devices can be any standard units or devices that support the USB specifications. Preferably, the units and devices shall support the most recent version of the USB specifications, but units and devices that support only earlier versions of the USB specifications are also permissible.

In one preferred embodiment of the data communications network, the data communications network is comprised of a dedicated link connecting a host computer and a remote extender unit.

In a further preferred embodiment of the data communications network, the data communications network is comprised of a network, and more preferably a shared network that may carry other traffic in addition to the USB traffic travelling between the host computer and the remote extender unit. Networks such as those based on wired Ethernet, wireless Ethernet, the public Internet, private intranets and combinations of these networks are, for example, suitable for this application.

In a preferred embodiment, a USB transceiver, and preferably a USB 2.0 or USB 3.0 transceiver, or the like, shall be provided at the remote extender unit, for connection to any peripheral devices, or USB hubs, as desired, using a USB cable that conforms to the USB Specification.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE INVENTION

Figure 1:
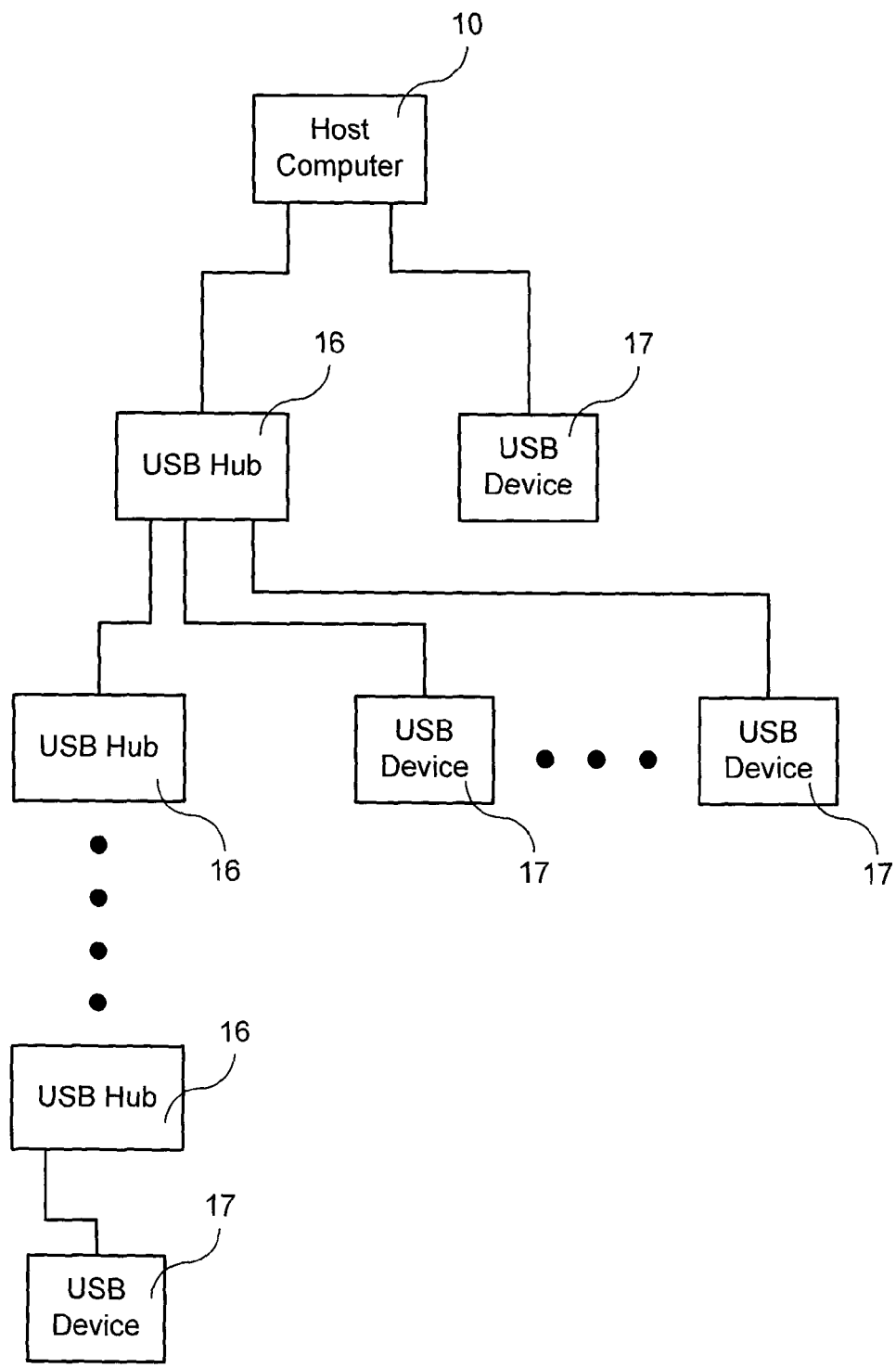
FIG. 1 is a block diagram of a typical USB system according to the prior art USB specifications.

FIG. 1 is a block diagram of a prior art system assembled according to the USB Specifications. According to the USB Specifications, a USB-enabled host computer (10) may be connected to one or a plurality of USB devices (17) either directly, or through one or a chain of USB hubs (16). A device cannot be connected to another device and the maximum number of hubs that can be connected in a single serial chain is five. A device may also be connected directly to a host computer. The maximum length of each cable used to interconnect a computer, hub or device is 5 meters.

In FIG. 1, and in any following figures, dotted lines are used to represent additional connections or devices since the USB Specification is not limited to the number of connections and devices shown in the figure.

Figure 2:
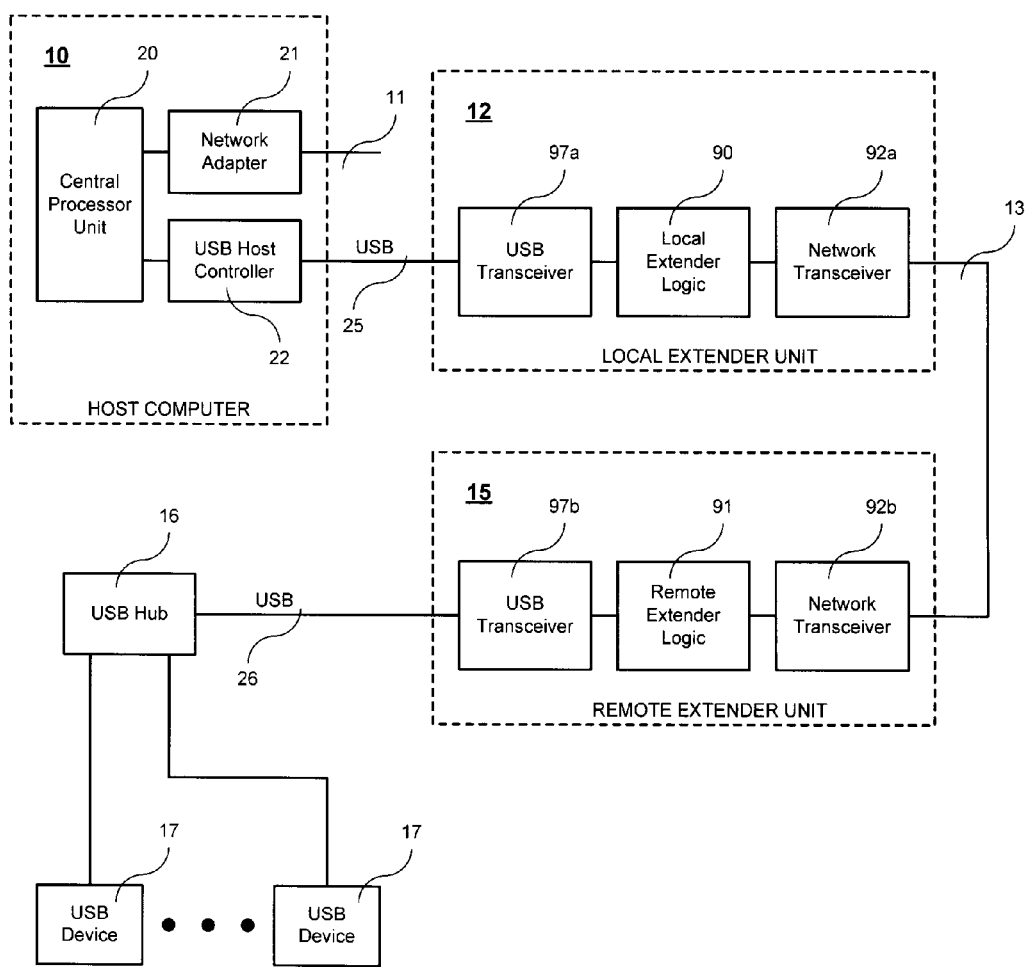
FIG. 2 is a block diagram of a USB extender subsystem showing the required communication components, according to the prior art.

FIG. 2 shows a system for extending the range of USB, according to the prior art. A standard, non-modified host computer (10) communicates with standard, non-modified USB peripheral devices (17) through a local extender unit (12), a long non-USB cable (13) and a remote extender unit (15). A USB hub (16) may also be connected between remote extender unit (15) and USB peripheral devices (17) to enable a plurality of remote USB peripheral devices to be controlled by a single host computer.

In a "data-read" example under this scheme, central processor unit (20) within host computer (10) operates upon USB host controller (22) to send a first USB subaction to local extender unit (12) across USB cable (25). The first USB subaction is received by USB transceiver (97a) and forwarded to local extender logic (90). The local extender logic (90) formats the first USB subaction for transmission through network transceiver (92a), long cable (13) and network transceiver (92b) to remote extender logic (91). Local extender logic (90) may also generate an acknowledgement subaction for transmission through USB transceiver (97a) and USB cable (25) to host computer (10). Upon receipt of the first USB subaction, remote extender logic (91) converts the format of the first USB subaction for transmission over USB and forwards the first USB subaction as a sequence of one, two or three USB packets through USB transceiver (97b), USB cable (26) and (optionally) USB hub (16) to USB peripheral device (17).

Upon receipt of the first USB subaction at USB peripheral device (17), the USB peripheral device may generate a response subaction and forward the response subaction through USB cable (26) and USB transceiver (97b) to remote extender logic unit (91). The remote extender logic unit (91) formats the response subaction for transmission through network transceiver (92b), long cable (13) and network transceiver (92a) to local extender logic (90) where the response subaction is then stored for later use. The remote extender logic (91) may also generate a second acknowledgement subaction for transmission through USB transceiver (97b) and USB cable (26) to USB peripheral device (17).

At a later time, host computer (10) will repeat the original first USB subaction intended for USB peripheral device (17). This repeated subaction is also transmitted through USB cable (25) and USB transceiver (97a) to local extender logic (90). When the repeated USB subaction is received by local extender logic (90), the local extender logic (90) retrieves the previously received response subaction from storage and transmits the response subaction to host computer (10) through USB transceiver (97a) and USB cable (25).

It will be apparent to those skilled in the art that long cable (13) may be any suitable form of a data transmission device, including cables such as a CAT-5 twisted pair cable, or fiber optic cable, but can also be replaced by a data communications network having connections to a local extender unit (12) and to a remote extender unit (15).

It will be further apparent to those skilled in the art that a "data-write" operation, or any other USB-related function, can follow a similar sequence to that described previously.

It will be noticed that the prior art system of FIG. 2 requires that two network transceivers (92a, 92b) be provided, one at each end of long cable (13). This is in addition to a further network transceiver which is typically installed in host computer (10) as indicated by network adapter (21).

With respect to the present invention, it will be apparent to those skilled in the art that network transceivers can be expensive components and can thereby dominate the cost of the local extender and the remote extender units. It will be further apparent that if network transceiver (92a) can be eliminated from local extender unit (12), then a significant reduction in the cost of the complete USB extender system can be achieved. It will also be apparent to those skilled in the art that host computers are often pre-equipped with a network transceiver for data communication purposes.

It will also be apparent to those skilled in the art that a network transceiver must be associated with, or must incorporate, a means for physically connecting the network transceiver to long cable (13) or equivalent data communications network. The physical connection means may typically take the form of an antenna for wireless communications, an RJ45 receptacle for electrical communications or a dual-LC receptacle for optical communications. It will be further apparent that if the physical connection means associated with network transceiver (92a) can also be eliminated, then the physical size of local extender unit (12) can be reduced and the requirement for the local extender unit to be accessible and robust for cable attachment purposes can be eliminated.

It will also be apparent to those skilled in the art that a network transceiver may consume a significant quantity of electrical power in order to achieve reliable communications over extended distances. By eliminating network transceiver (92a) from local extender unit (12), a significant reduction in power consumption by local extender unit (12) can be achieved, resulting in lower heat dissipation and yet lower size and cost.

It will be further apparent to those skilled in the art that still greater savings in cost, size and power consumption may be realized if the local extender unit can be eliminated in its entirety.

Figure 3:
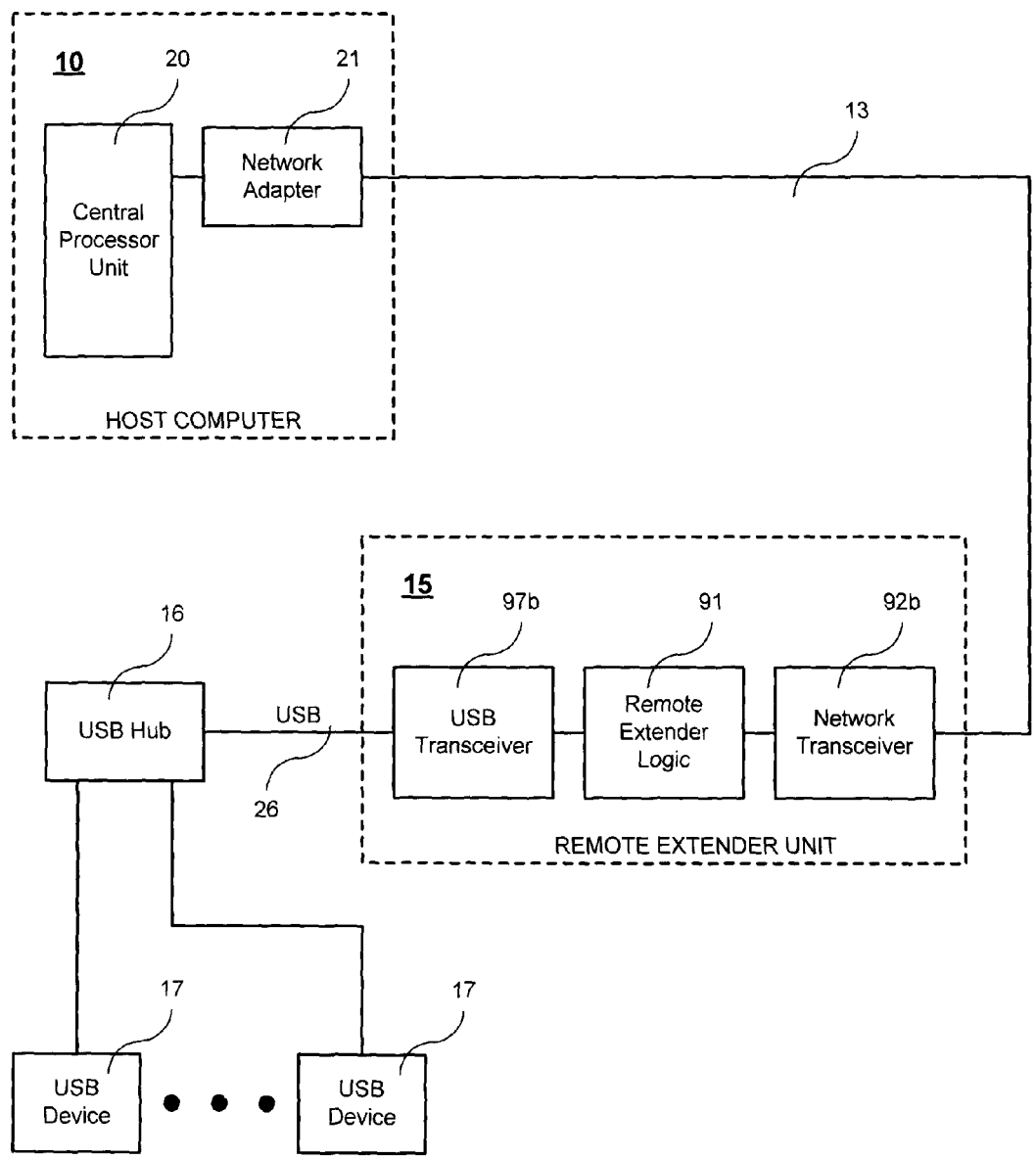
FIG. 3 is a block diagram of a USB system according to the present invention.

FIG. 3 is a block diagram of a USB extender system showing the required communication components, according to the present invention. A standard, non-modified, USB-enabled host computer (10) equipped with a network adapter (21) communicates with a standard, non-modified USB peripheral device (17) through a long cable (13) and a remote extender unit (15). A USB hub (16) may also be connected between remote extender unit (15) and USB peripheral device (17) to enable a plurality of USB peripheral devices to be controlled by a single host computer.

In a "data-read" example under this scheme, central processor unit (20) within host computer (10) operates upon network adapter (21) to transmit a first USB subaction. (The interaction between central processor (20) and network adapter (21) is further described in FIG. 8 and FIG. 10). Network adapter (21) formats the first USB subaction for transmission through long cable (13) and network transceiver (92b) to remote extender logic (91). Upon receipt of the first USB subaction, remote extender logic (91) converts the format of the first USB subaction for transmission over USB and forwards the first USB subaction through USB transceiver (97b), USB cable (26) and (optionally) USB hub (16) to USB peripheral device (17).

Upon receipt of the first USB subaction at USB peripheral device (17), the USB peripheral device may generate a response subaction and forward the response subaction through USB cable (26) and USB transceiver (97b) to remote extender logic unit (91). The remote extender logic unit formats the response subaction for transmission through network transceiver (92b), long cable (13) and network adapter (21) to central processor unit (20) where the response subaction is then stored for later use. The remote extender logic (91) may also generate a second acknowledgement subaction for transmission through USB transceiver (97b) and USB cable (26) to USB peripheral device (17).

The stored response subaction is operated upon by central processor unit (20) to extract its information content and to provide said content to a USB software driver stack installed on central processor unit (20). This operation is described in more detail in FIG. 8.

It will be apparent to those skilled in the art that long cable (13) may again be replaced by a data communications network having a connection to host computer (10) and another connection to remote extender unit (15).

It will be further apparent to those skilled in the art that a "data-write" operation can follow a similar sequence.

Figure 4:
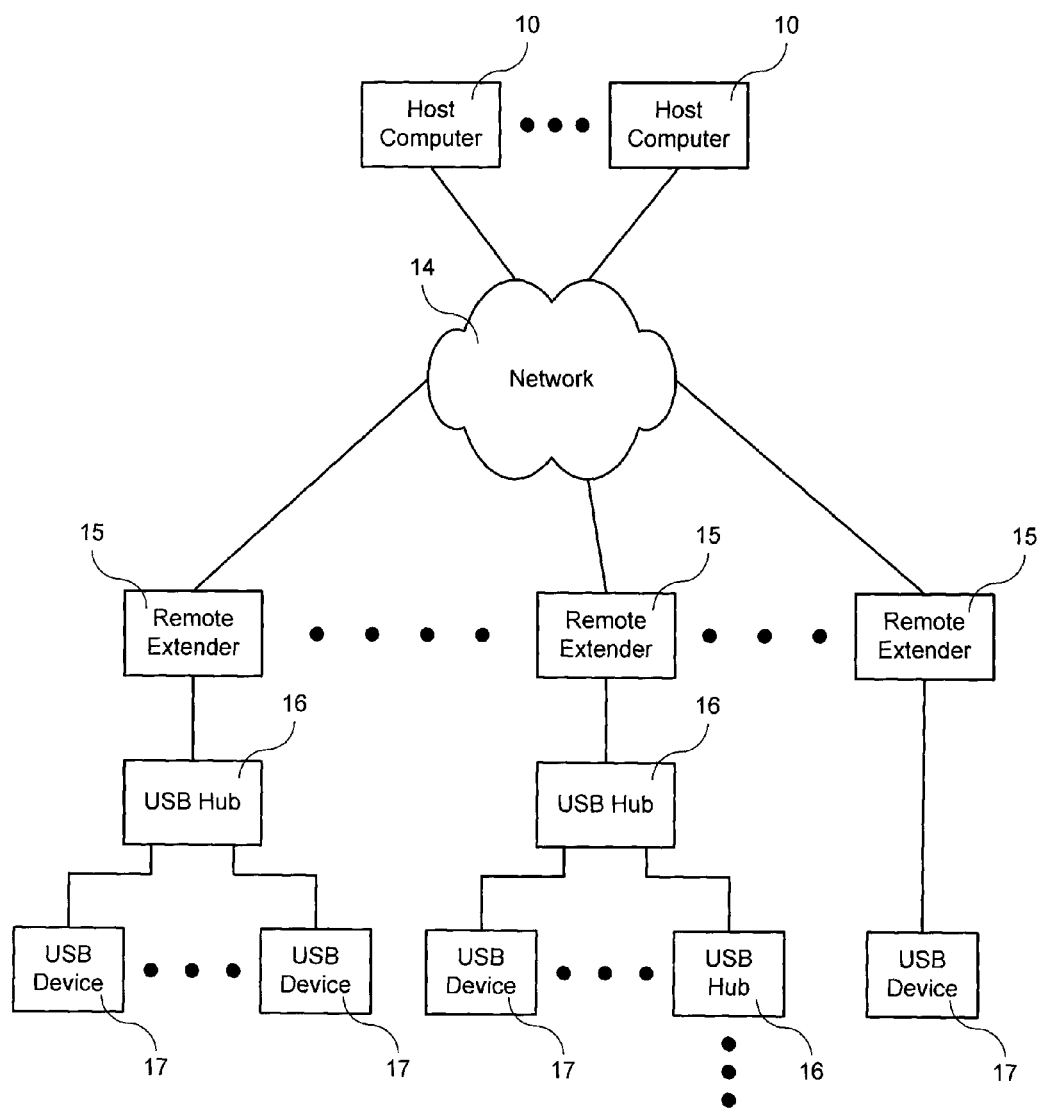
FIG. 4 is a block diagram of a preferred USB system according to the present invention.

FIG. 4 is a block diagram of a preferred USB system according to the present invention. In this arrangement, each USB peripheral device (17) is connected to a remote extender unit (15) either directly, or through one or a chain of USB hubs (16). One or a plurality of remote extender units is also connected to a data communications network (14). Also in the arrangement, one or a plurality of host computers (10) is connected to data communications network (14). When a host computer (10) wishes to communicate with a USB peripheral device (17) the host computer (10) transmits a USB subaction across data communications network (14) to remote extender unit (15). The transmission of the USB subaction across data communications network (14) may be broadcast to all remote extender units (15) or it may be directed towards a single remote extender unit (15) or it may be directed towards a group of remote extender units (15). The remote extender unit (15) then forwards the USB subaction to USB peripheral device (17) either directly, or through intermediate USB hub (16). A similar process applies for data or subactions traveling in the reverse direction from USB peripheral device (17) to host computer (10).

In this embodiment of the present invention, a particular arrangement of three remote extender units and two host computers has been chosen. It will be apparent to those skilled in the art that this selection of units is not intended as a limitation on the scope of the invention, and that different populations of these remote extender units and host computers might be used and that alternative connection arrangements are possible.

Also in this embodiment of the present invention, data communications network (14) is shown as supporting a plurality of connections. It will again be apparent to those skilled in the art that the data communications network may support only a single connection to a single host computer (10) and a single connection to a single remote extender unit (15) and thereby may be replaced by a point-to-point connection between the single host computer and the single remote extender unit.

Figure 5:
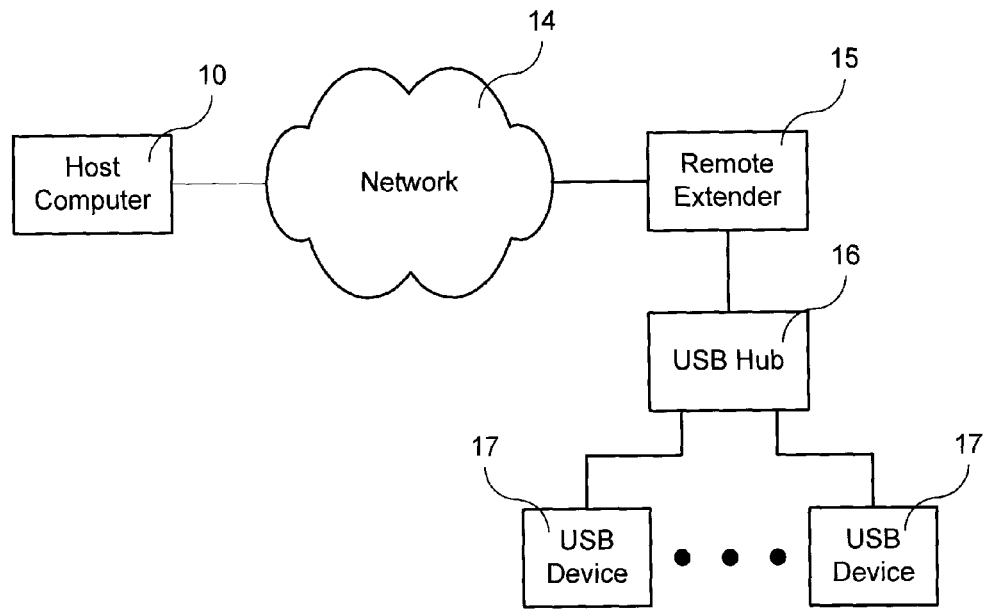
FIG. 5 is a block diagram of a further preferred USB system according to the present invention.

For example, FIG. 5 is a block diagram of an alternative embodiment of a preferred USB system according to the present invention. In this configuration, only a single host computer (10) is connected to network (14).

Figure 6:
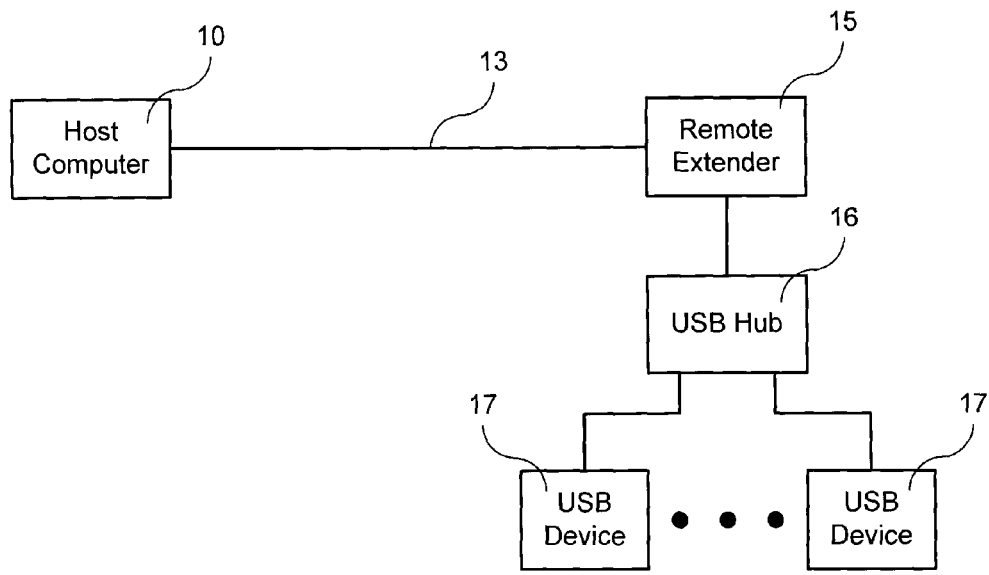
FIG. 6 is a block diagram of a yet further preferred USB system according to the present invention.

Alternatively, FIG. 6 is a block diagram of a further preferred USB system according to the present invention. In this arrangement, a point-to-point connection (13), acting as a simple data communication network, is provided between host computer (10) and remote extender unit (15). Again, it will be apparent to those skilled in the art that the point-to-point connection (13) may be provided by a variety of communications media including twisted-pair cable, coaxial cable, fiber-optic cable and wireless.

Figure 7:
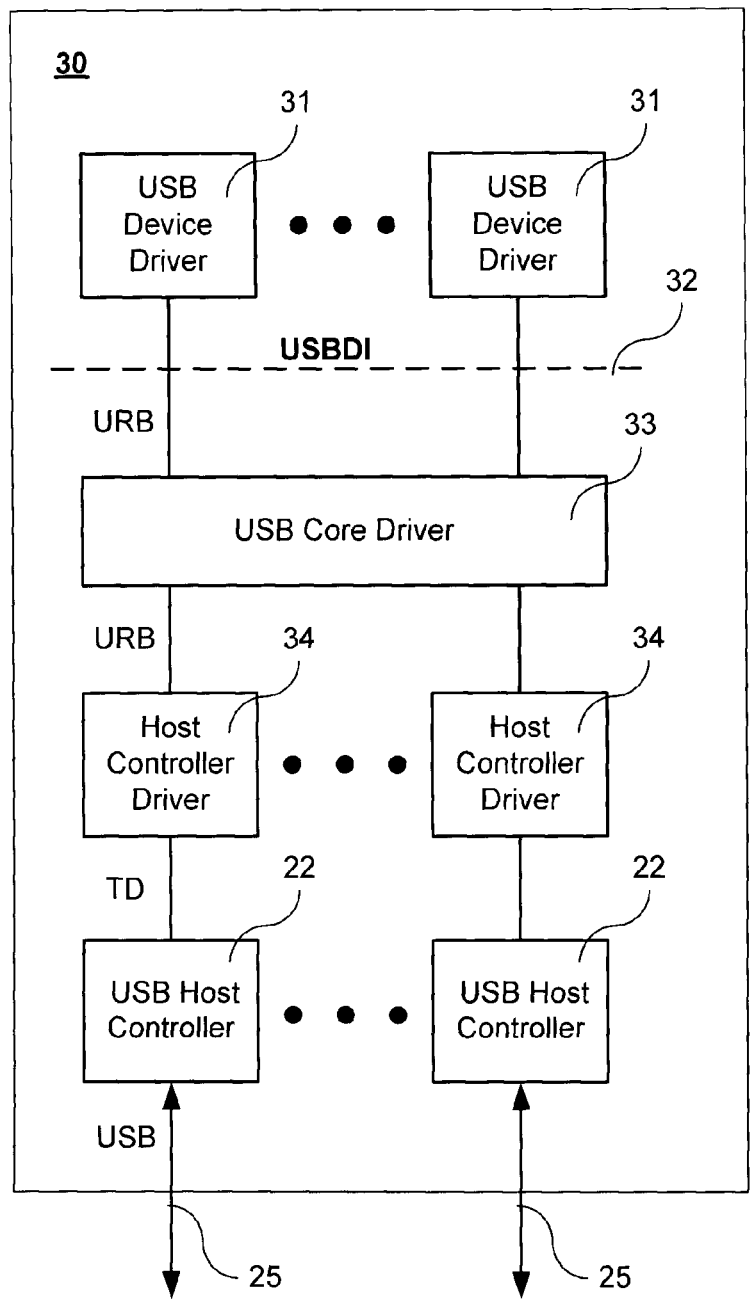
FIG. 7 is a block diagram of a host computer driver stack according to the prior art USB specifications.

FIG. 7 is a block diagram of a host computer driver stack according to the prior art USB specifications. The USB driver stack (30) is comprised of software and hardware arranged in layers. At the top of the stack are one or more USB device drivers (31) that implement functions required by a particular class of USB device, such as mass storage class, human interface class and others. The various USB device drivers (31) issue requests to the USB core driver (33) across a standard interface (32) known as the USB driver interface (USBDI). The data structure used to communicate between USB device driver (31) and USB core driver (33) is the USB Request Block (URB).

The USB core driver (33) is responsible for directing USB requests issued by the higher layer drivers to the hardware on which the requests are implemented. The USB hardware takes the form of a USB host controller (22). Common forms of USB host controller include OHCI (Open Host Controller Interface), UHCI (Universal Host Controller Interface) and EHCI (Enhanced Host Controller Interface). A particular host controller driver (34) is associated with each USB host controller (22). The data structure used to communicate between USB core driver (33) and host controller driver (34) is again the URB. The data structure used to communicate between the host controller driver (34) and the host controller hardware is the Transfer Descriptor (TD). The TD is a low-level structure highly correlated with the format of the physical (wire-level) packets issued by USB host controller (22) onto the USB cable (25). Each individual URB is translated into a sequence of TD's by host controller driver (34).

Figure 8:
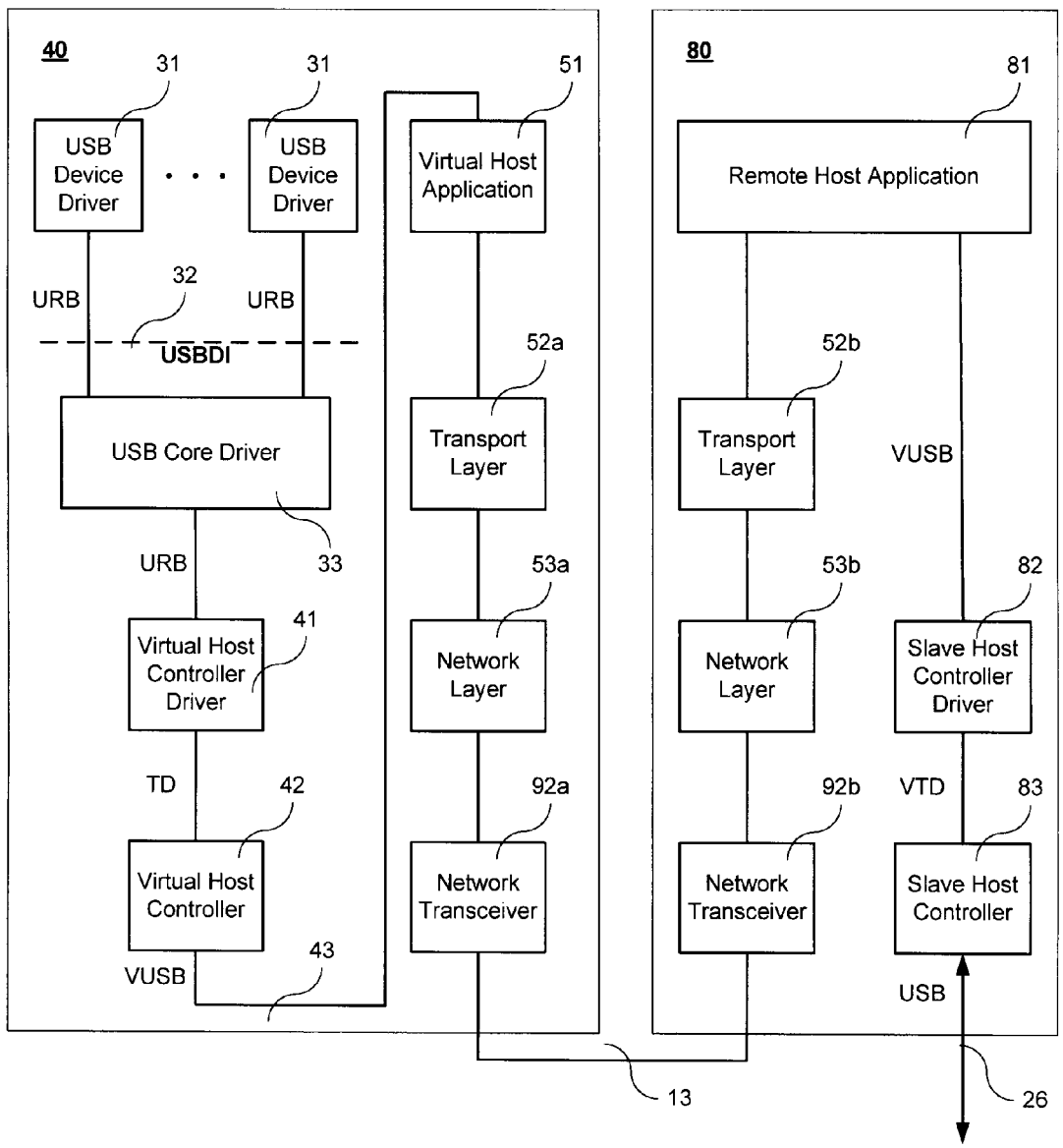
FIG. 8 is a block diagram of a USB communication system showing the partitioning of processing functions, according to the present invention.

FIG. 8 is a block diagram of a preferred USB communication system showing the partitioning of processing functions, according to the present invention. It should be noted that software stack (40) is designed to operate within host computer (10), and that software stack (80) is designed to operate within remote extender (15).

The host computer software stack (40) is comprised of a USB driver stack (units 31, 32, 33, 41 and 42) and a communications stack (52a, 53a and 92a) linked by a virtual host application (51).

The host computer USB driver stack is comprised of software arranged in layers. At the top of the stack are the USB device drivers (31) that implement functions required by a particular class of device, such as mass storage class, human interface class and others. The USB device drivers (31) issue requests to the USB core driver (33) across standard interface (32) known as the USB driver interface (USBDI). The data structure used to communicate between USB device driver (31) and USB core driver (33) is the USB Request Block (URB). The preservation of this architecture enables the system to operate with all standard operating systems and USB device class drivers. As such, the host computer is USB-enabled, and is non-modified in the sense that no hardware or operating system software has been modified.

Below the USB core driver (33) is a virtual host controller driver (41) and a virtual host controller (42). When the USB core driver (33) receives an URB that pertains to a USB device connected to a remote extender (15), the USB core driver (33) issues an URB to virtual host controller driver (41), whereupon virtual host controller driver (41) "decomposes" the received URB into a sequence of Transfer Descriptors which are then applied to virtual host controller (42). Virtual host controller (42) translates each received TD into a packet format whose information content is equivalent to that of a wire-line USB packet. The translated TD packet format is then issued by virtual host controller (42) on software interface (43) as a Virtual USB packet (VUSB).

The virtual host controller (42) and virtual host controller driver (41) may be added to the operating software of a host computer by installing the corresponding software modules. This can be accomplished by downloading the installation files containing the software modules over the internet or from an external storage medium such as a USB flash drive. Once present on the host computer, the installation files are executed to install the virtual host controller (42) and virtual host controller driver (41) modules into the file system of the host computer operating system. Additionally, the installation files will call the operating system Application Programming Interface (API) in order to make the USB Core Driver (33) aware that a new resource—the virtual host controller driver (41)—is available. Preferably, the installation files will also call the device management API to add the virtual host controller (42) to the list of hardware devices present on the host computer, thereby enabling the user to view the status and connectivity of the virtual host controller (42) through the same interface as would be used for a hardware-based USB host controller (22).

The host computer communications stack is composed of a transport layer (52a) and a network layer (53a) that perform successive levels of encapsulation upon packets supplied by virtual host application (51) for presentation to network transceiver (92a). These components are similarly responsible for removing the encapsulation when packets travel in the reverse direction from network transceiver (92a) to virtual host application (51).

It will be apparent to those skilled in the art that various arrangements of transport layer (52a) and network layer (53a) are possible and that the layers can be combined or eliminated in particular applications. In a preferred embodiment of the host computer communications stack the transport layer (52a) implements the Transmission Control Protocol (TCP) and the network layer (53a) implements the Internet Protocol (IP).

The remote extender software stack (80) is comprised of a USB driver stack (units 82 and 83) and a communications stack (52b, 53b and 92b) linked by a remote host application (81).

The remote extender USB driver stack is composed of a slave host controller driver (82) and a slave host controller (83). The slave host controller driver (82) is responsible for scheduling USB transactions to be generated by slave host controller (83).

It will be apparent to those skilled in the art that various arrangements of slave host controller driver (82) and slave host controller (83) are possible and that the units can be combined or eliminated in particular applications. In a preferred embodiment of the remote extender USB driver stack the slave host controller is a UHCI, OHCI or EHCI unit.

The remote extender communications stack is typically identical in function to that of the host computer.

The operation of this system will now be explained by way of an example in which data is read from a USB mass storage device. The operation is initiated by user action which causes USB device driver (31) to issue a USB Request Block (URB) across interface USBDI (32). The URB is targeted at USB device (17). USB core driver (33) receives the URB from USB device driver (31), recognizes that the USB device is serviced by virtual host controller driver (41), and forwards the URB to virtual host controller driver (41). Virtual host controller driver (41) translates the single URB into a sequence of Transfer Descriptors (TD's) which it then applies to virtual host controller (42). Virtual host controller (42) operates on each individual TD to generate a virtual USB packet containing a USB Packet Identifier (PID), a USB address and an optional data payload. Examples of USB PID's that may be used in this context include an IN PID when data is required from the USB device and an OUT PID when data is required to be sent to the USB device.

Virtual host controller (42) sends each virtual USB packet (corresponding to an individual Transfer Descriptor) to the virtual host application (51) on a schedule that is consistent with the operation of a physical USB host controller. Virtual host application (51) operates on a network communications stack, comprising transport layer (52a) and network layer (53a) to cause the contents of each virtual USB packet to be transmitted by network transceiver (92a) over long cable (13).

After transmission over long cable (13), each virtual USB packet is received by network transceiver (92b) and communicated up the network communications stack through network layer (53b) and transport layer (52b) to remote host application (81). Each virtual USB packet is then examined by remote host application (81) to determine the identity of the host controller responsible for the target device and delivered to the selected slave host controller driver (82). The slave host controller driver (82) operates upon slave host controller (83) to convert the virtual USB packet into a standard USB subaction for delivery to USB device (17) over USB cable (26).

If the PID of the delivered USB subaction indicates an IN command then the USB peripheral device normally responds with a DATA0, DATA1, or NAK packet. If the PID of the standard USB packet is an OUT command then the USB device normally responds with an ACK, NAK or NYET packet. If USB device (17) expects to receive an acknowledgement of its response (such as when the USB device supplies a DATA0 or DATA1 packet), then this acknowledgement is provided by slave host controller (83) over USB cable (26).

The response generated by USB device (17) is received by slave host controller (83) and forwarded to slave host controller driver (82) where it is converted into a virtual USB packet. The Virtual USB packet is then forwarded to remote host application (81) which determines the identity of the virtual host controller that initiated the transaction. The remote host application (81) determines the network address of the initiating virtual host controller and operates upon transport layer (52b), network layer (53b) and network transceiver (92b) to encapsulate the virtual USB packet for transmission across long cable (13) to host computer software stack (40).

The Virtual USB packet is received at host computer software stack (40) by network transceiver (92a) and forwarded up the communications stack through network layer (53a) and transport layer (52a) to virtual host application (51). The virtual host application (51) examines the virtual USB packet and determines that the packet is to be routed to virtual host controller (42). Virtual host controller (42) receives the Virtual USB packet over software interface (43) and converts the Virtual USB packet into a Transfer Descriptor for delivery to virtual host controller driver (41). Virtual host controller driver (41) assembles one or a plurality of delivered Transfer Descriptors into a USB Request Block and forwards the URB through USB core driver (33) to the original USB device driver (31).

It will be observed that, in comparison with the prior art, virtual host controller (42) is not required to issue repeated requests to obtain a single Virtual USB packet. The prior art is constrained by the turn-around timer implemented in every EHCI, UHCI and OHCI host controller. This turn-around timer requires that a response to a USB command must be provided within approximately 1.5 microseconds. The prior art accommodates this requirement by storing a response to a first USB command until a second or subsequent USB command is issued by the host controller. A virtual host controller, however, may be configured to operate with a longer or infinite turn-around timer such that the virtual host controller can issue a first USB command and then wait until the response is available. Network delays of 1.5 microseconds or more can be accommodated with this approach.

It will be apparent to those skilled in the art that a similar process occurs when data is written, in the reverse direction, to a USB mass storage device.

Figure 9:
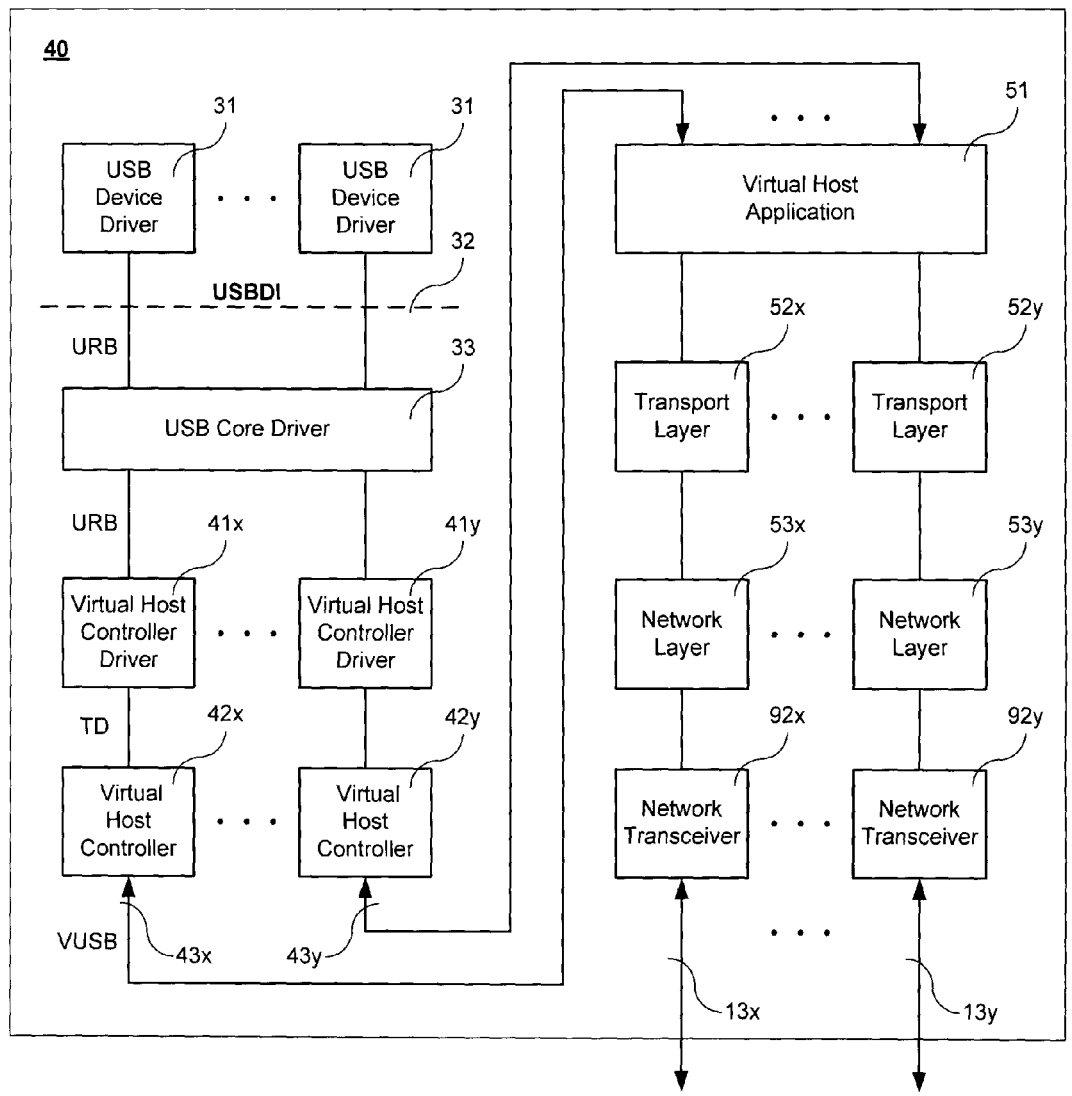
FIG. 9 is a block diagram of a preferred host computer driver stack according to the present invention.

FIG. 9 is a block diagram of a preferred host computer driver stack according to the present invention. In this arrangement, the host computer driver stack is expanded to enable multiple network connections to be serviced by multiple USB host controllers.

In comparison with FIG. 8, the USB stack is expanded to include a plurality of virtual host controller drivers ($41x \ldots 41y$) and a plurality of virtual host controllers ($42x \ldots 42y$). Also in comparison with FIG. 8, the communications stack is expanded to include a plurality of transport layers ($52x \ldots 52y$), a plurality of network layers ($53x \ldots 53y$) and a plurality of network transceivers ($92x \ldots 92y$) feeding a plurality of network connections ($13x \ldots 13y$).

Figure 10:
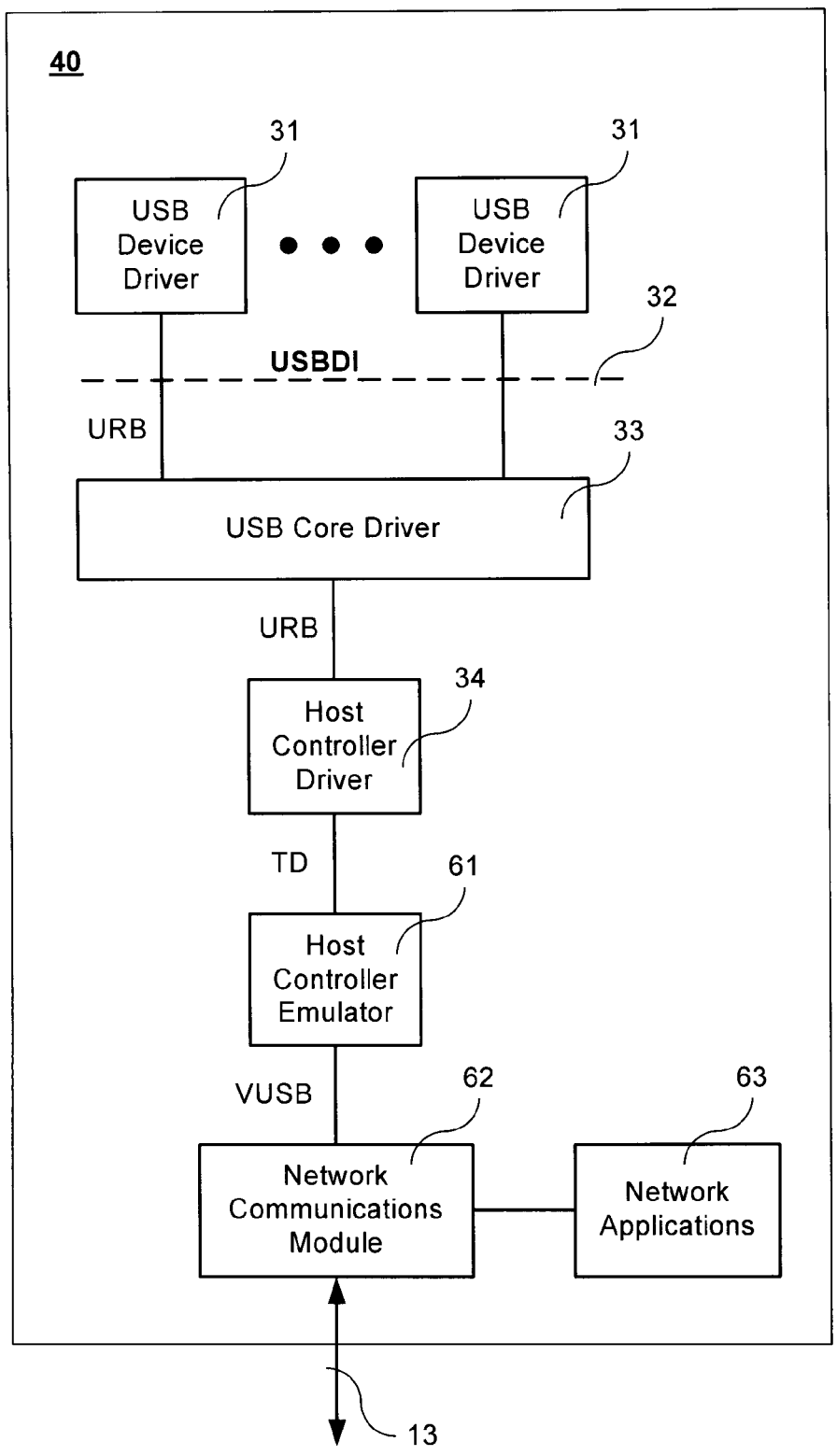
FIG. 10 is a block diagram of a further preferred host computer driver stack according to the present invention.

FIG. 10 is a block diagram of a further preferred host computer driver stack according to the present invention. In this arrangement, URB's generated by USB core driver (33) are presented to host controller driver (34). Host controller driver (34) translates each URB into a sequence of transfer descriptors and passes these transfer descriptors to host controller emulator (61). Host controller emulator (61) translates each received TD into a packet format whose information content is equivalent to that of a physical (wire-line) USB subaction. The translated TD packet format is then issued by host controller emulator (61) as a virtual USB packet to network communications module (62). Network communications module (62) may then multiplex the virtual USB packets with unrelated traffic received from network applications module (63) before transmitting the combined traffic over long wire (13).

In a preferred embodiment of this arrangement host controller driver (34) is a Universal Host Controller Driver and host controller emulator (61) emulates a UHCI controller.

In a further preferred embodiment of this arrangement host controller driver (34) is an Open Host Controller Driver and host controller emulator (61) emulates an OHCI controller.

In a yet further preferred embodiment of this arrangement host controller driver (34) is an Enhanced Host Controller Driver and host controller emulator (61) emulates an EHCI controller.

In this arrangement, external communications is through long wire (13). It will be apparent to those skilled in the art that long wire (13) can be replaced by network (14) without alteration to the invention.

Figure 11:
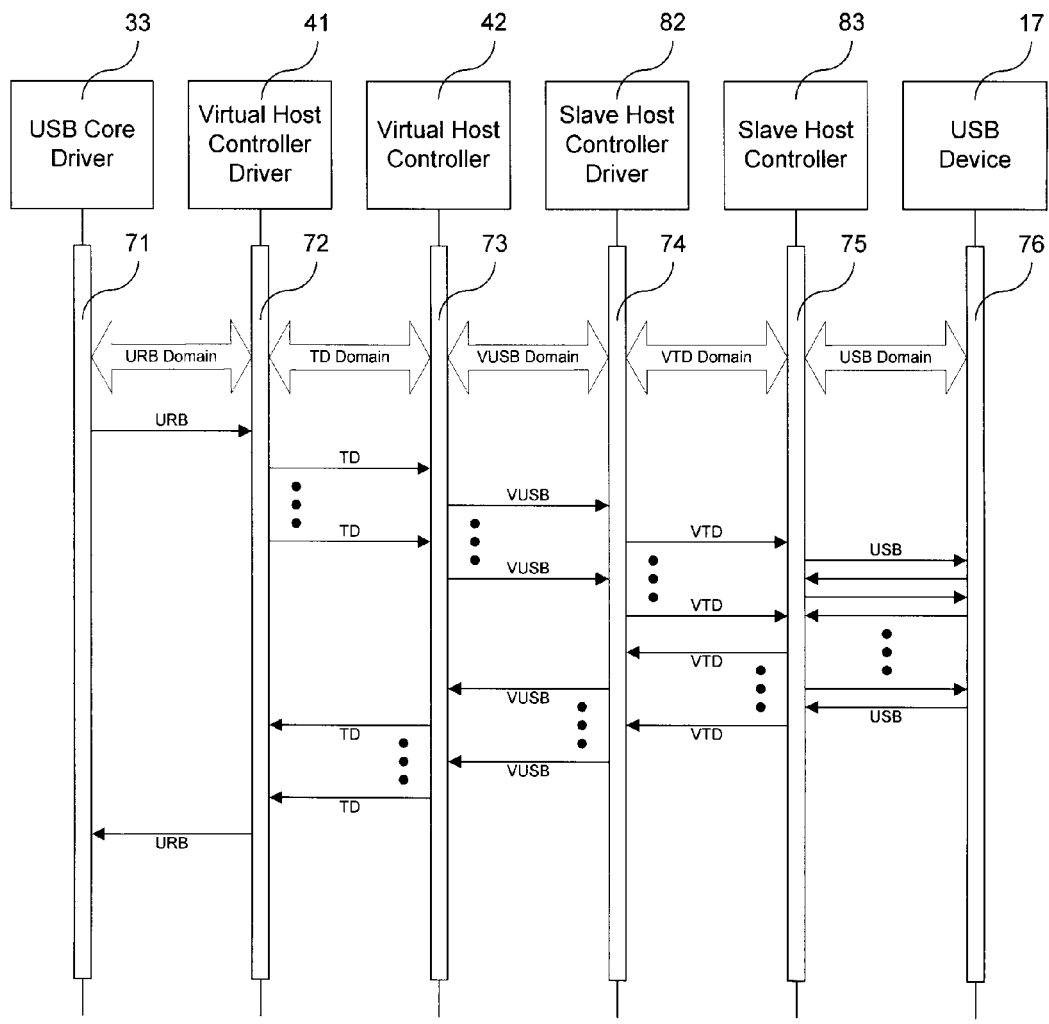
FIG. 11 is a sequence diagram showing the transformations that are applied to USB information in response to a USB Request Block issued by a host computer according to the present invention.

FIG. 11 is a sequence diagram showing the transformations that are applied to USB information in response to a USB Request Block issued by a host computer according to the present invention.

The behavior shown by sequence (71) is executed by the logic implemented within USB core driver (33). The behavior shown by sequence (72) is executed by the logic implemented within virtual host controller driver (41). The behavior shown by sequence (73) is executed by the logic implemented within virtual host (42). The behavior shown by sequence (74) is executed by the logic implemented within slave host controller driver (82). The behavior shown by sequence (75) is executed by the logic implemented within slave host controller (83). The behavior shown by sequence (75) is executed by the logic implemented within USB device (17). The contribution of the communications stacks and host applications are not shown in the diagram since these components are involved only in the routing and remote delivery of packet information and do not have any effect on the format or content of the data that is presented to the USB components. The end-to-end behavior is consistent with the physical arrangement shown in FIG. 8.

The sequence is initiated when the USB core driver (33) in a host computer (10) issues a USB Request Block (URB) to the virtual host controller driver (41). The virtual host controller driver (41) translates the URB into a sequence of Transfer Descriptors (TD) which are applied to the virtual host controller (42). The virtual host controller (42) converts each TD into a Virtual USB (VUSB) packet which is transmitted over a communications system and arrives unchanged at a slave host controller driver (82) in a remote extender (15). The slave host controller driver (82) converts each Virtual USB packet into a Virtual Transfer Descriptor (VTD) and schedules the VTD for execution by the slave host controller (83). The slave host controller (83) translates each VTD into a standard USB subaction and issues the USB subaction as a USB command subaction on the physical bus according to USB priority and timing requirements. The USB command subaction is received by USB device (17) and a USB response packet may be generated by USB device (17) depending upon the PID of the USB command subaction and the type of the USB endpoint (Bulk, Control, Interrupt or Isochronous) to which the USB command subaction was addressed. A further USB acknowledgement packet may be issued by slave host controller (83) to USB device (17) to complete the USB transaction. The slave host controller (83) continues to issue USB command subactions for as long as it is supplied with Virtual Transfer Descriptors.

When slave host controller (83) receives a USB response packet from USB device (17), the slave host controller (83) converts each USB response packet into a Virtual Transfer Descriptor and forwards the VTD to slave host controller driver (82). The slave host controller driver (82) receives each VTD from slave host controller (83), converts the VTD into a Virtual USB packet and forwards the Virtual USB packet across the data communications network to the virtual host controller (42) in host computer (10).

The virtual host controller (42) receives each Virtual USB packet from slave host controller driver (82), converts each Virtual USB packet into a Transfer Descriptor and supplies each TD to the virtual host controller driver (41). The virtual host controller driver (41) receives each TD from virtual host controller (42) and assembles a USB Request Block for delivery to USB core driver (33).

For clarity, FIG. 11 shows the transmissions in the upstream direction from slave host controller (83) to slave host controller driver (82) as occurring after all transmissions in the downstream direction have completed. It will be apparent to those skilled in the art that this restriction is not necessary and that upstream transmissions can begin as soon as a first USB response packet is received from USB device (17) and that upstream and downstream transmissions can occur virtually simultaneously at any point in the system.

Thus, it is apparent that there has been provided, in accordance with the present invention, a method and apparatus for connecting USB devices to a remote computer, which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

I claim:

1. A computer system for transmitting Universal Serial Bus (USB) traffic between one or a plurality of host computers and one or a plurality of USB peripheral devices, wherein said one or a plurality of host computers and said one or a plurality of USB peripheral devices are connected one to the other by a data communications network, said computer system comprising:
   a. one or a plurality of host computers for generating and accepting USB traffic;
   b. one or a plurality of USB peripheral devices capable of responding to USB traffic initiated by said one or a plurality of host computers;
   c. one or a plurality of network connections between said one or a plurality of host computers and said data communications network;
   d. one or a plurality of remote extender unit units, connected to said data communications network and utilized for connecting said one or a plurality of USB peripheral devices to said data communications network;
   e. one or a plurality of host controller drivers in said one or a plurality of host computers for converting between USB Request Blocks and USB Transfer Descriptors;
   f. one or a plurality of virtual host controllers in said one or a plurality of host computers for converting between USB Transfer Descriptors and virtual USB packets;

g. a virtual host application in said one or a plurality of host computers for establishing connection paths between said one or a plurality of virtual host controllers and said one or a plurality of USB peripheral devices;

h. a remote host application in said one or a plurality of remote extender units for establishing connection paths between said one or a plurality of virtual host controllers and said one or a plurality of USB peripheral devices;

i. a slave host controller driver in said one or a plurality of remote extender units for converting between virtual USB packets and USB Transfer Descriptors; and j. a slave host controller in said one or a plurality of remote extender units for converting between USB Transfer Descriptors and USB packets.

2. A computer system as claimed in claim 1 wherein said host controller driver is a virtual host controller driver capable of operating upon a virtual host controller to generate and accept virtual USB packets.

3. A computer system as claimed in claim 1 wherein said host controller driver is a Universal Host Controller Driver and said virtual host controller emulates a Universal Host Controller Interface.

4. A computer system as claimed in claim 1 wherein said host controller driver is an Open Host Controller Driver and said virtual host controller emulates an Open Host Controller Interface.

5. A computer system as claimed in claim 1 wherein said host controller driver is an Enhanced Host Controller Driver and said virtual host controller emulates an Enhanced Host Controller Interface.

6. A method for transmitting Universal Serial Bus (USB) information from a host computer to a USB peripheral device across a data communications network, said method comprising;

a. generating a USB Request Block at a USB device driver;

b. forwarding said USB Request Block to a USB core driver as a forwarded USB Request Block;

c. delivering said forwarded USB Request Block to a host controller driver as a delivered USB Request Block;

d. transforming at a host controller driver said delivered USB Request Block into a sequence of Transfer Descriptors;

e. presenting said sequence of Transfer Descriptors to a virtual host controller as a presented sequence of Transfer Descriptors;

f. converting at a virtual host controller each individual Transfer Descriptor within said presented sequence of Transfer Descriptors into a virtual USB packet;

g. forwarding said virtual USB packet to a virtual host application as a forwarded virtual USB packet;

h. identifying at a virtual host application a network destination for said forwarded virtual USB packet and communicating said network destination to a network communications stack as an identified network address;

i. encapsulating at a network communications stack said forwarded virtual USB packet and said identified network address as an encapsulated virtual USB packet;

j. delivering said encapsulated virtual USB packet to a network transceiver as a delivered virtual USB packet;

k. transmitting at a first network transceiver said delivered virtual USB packet across a data communications network as a transmitted virtual USB packet;

l. receiving at a second network transceiver said transmitted virtual USB packet as received virtual USB packet;

m. forwarding at said second network transceiver said received virtual USB packet to a second network communications stack as a forwarded remote virtual USB packet;

n. extracting at said second network communications stack a virtual USB packet from said forwarded remote virtual USB packet as an extracted remote virtual USB packet;

o. delivering said extracted remote virtual USB packet to a remote host application as a delivered remote virtual USB packet;

p. identifying at a remote host application a slave host controller driver operable for said delivered remote virtual USB packet as an identified slave host controller driver;

q. conveying at a remote host application said delivered remote virtual USB packet to said identified slave host controller driver as a conveyed remote virtual USB packet;

r. scheduling at said identified slave host controller driver said conveyed remote virtual USB packet for transmission by a slave host controller as a scheduled remote virtual USB packet; and s. transmitting at said slave host controller said scheduled remote virtual USB packet across a USB cable as a standard USB packet.

7. A method as claimed in claim 6 wherein said USB information is a USB command.

8. A method as claimed in claim 6 wherein said USB information is a USB acknowledgement.

9. A method as claimed in claim 6 wherein said host controller driver is a virtual host controller driver capable of operating upon a virtual host controller to generate and accept virtual USB packets.

10. A method as claimed in claim 6 wherein said host controller driver is a Universal Host Controller Driver and said virtual host controller emulates a Universal Host Controller Interface.

11. A method as claimed in claim 6 wherein said host controller driver is an Open Host Controller Driver and said virtual host controller emulates an Open Host Controller Interface.

12. A method as claimed in claim 6 wherein said host controller driver is an Enhanced Host Controller Driver and said virtual host controller emulates an Enhanced Host Controller Interface.

13. A method for transmitting Universal Serial Bus (USB) information from a USB peripheral device to a host computer across a data communications network, said method comprising;

a. transmitting at a USB peripheral device a standard USB packet across a USB cable to a slave host controller;

b. receiving said standard USB packet at said slave host controller as a received USB packet;

c. optionally, at said slave host controller transmitting a USB acknowledgement packet across said USB cable;

d. forwarding at said slave host controller said received USB packet to a slave host controller driver as a virtual USB packet;

e. delivering at said slave host controller driver said virtual USB packet to a remote host application as a delivered virtual USB packet;

f. identifying at a remote host application a network destination for said delivered virtual USB packet and communicating said network destination to a network communications stack as an identified network address;

g. encapsulating at a network communications stack said delivered virtual USB packet and said identified network address as an encapsulated virtual USB packet;
h. conveying said encapsulated virtual USB packet to a network transceiver as a conveyed virtual USB packet;
i. transmitting at a first network transceiver said conveyed virtual USB packet across a data communications network as a transmitted virtual USB packet;
j. receiving at a second network transceiver said transmitted virtual USB packet as received virtual USB packet;
k. forwarding at said second network transceiver said received virtual USB packet to a second network communications stack as a forwarded local virtual USB packet;
l. extracting at said second network communications stack a virtual USB packet from said forwarded remote virtual USB packet as an extracted local virtual USB packet;
m. delivering said extracted local virtual USB packet to a virtual host application as a delivered local virtual USB packet;
n. identifying at a virtual host application a virtual host controller operable for said delivered local virtual USB packet as an identified virtual host controller;
o. conveying at a virtual host application said delivered local virtual USB packet to said identified virtual host controller as a conveyed local virtual USB packet;
p. presenting at said identified virtual host controller said delivered local virtual USB packet to a virtual host controller driver as a presented local virtual USB packet;
q. aggregating at said virtual host controller driver a sequence of one or a plurality of said presented local virtual USB packets as a USB Request Block response;
r. delivering at said virtual host controller driver said USB Request Block response to a USB core driver as a delivered USB Request Block response; and
s. forwarding at said USB core driver said delivered USB Request Block response to a USB device driver as a forwarded USB Request Block response.

14. A method as claimed in claim 13 wherein said USB information is a USB command.

15. A method as claimed in claim 13 wherein said USB information is a USB acknowledgement.

16. A method as claimed in claim 13 wherein said host controller driver is a virtual host controller driver capable of operating upon a virtual host controller to generate and accept virtual USB packets.

17. A method as claimed in claim 13 wherein said host controller driver is a Universal Host Controller Driver and said virtual host controller emulates a Universal Host Controller Interface.

18. A method as claimed in claim 13 wherein said host controller driver is an Open Host Controller Driver and said virtual host controller emulates an Open Host Controller Interface.

19. A method as claimed in claim 13 wherein said host controller driver is an Enhanced Host Controller Driver and said virtual host controller emulates an Enhanced Host Controller Interface.

* * * * *